(12) United States Patent
Sakamoto et al.

(10) Patent No.: US 9,163,136 B2
(45) Date of Patent: Oct. 20, 2015

(54) NITRILE RUBBER COMPOSITION AND CROSS-LINKED RUBBER

(71) Applicants: Masato Sakamoto, Toyko (JP); Tomonori Nakashima, Tokyo (JP); Kazuhiro Ejiri, Tokyo (JP); Masanobu Shinohara, Tokyo (JP)

(72) Inventors: Masato Sakamoto, Toyko (JP); Tomonori Nakashima, Tokyo (JP); Kazuhiro Ejiri, Tokyo (JP); Masanobu Shinohara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/359,055

(22) PCT Filed: Nov. 16, 2012

(86) PCT No.: PCT/JP2012/079760
§ 371 (c)(1),
(2) Date: May 16, 2014

(87) PCT Pub. No.: WO2013/073660
PCT Pub. Date: May 23, 2013

(65) Prior Publication Data
US 2014/0323658 A1    Oct. 30, 2014

(30) Foreign Application Priority Data

Nov. 18, 2011 (JP) ................. 2011-252303

(51) Int. Cl.
*C08L 13/00* (2006.01)
*C08L 39/00* (2006.01)
*C08L 33/18* (2006.01)
*C08L 15/00* (2006.01)

(52) U.S. Cl.
CPC ............... *C08L 13/00* (2013.01); *C08L 15/005* (2013.01); *C08L 33/18* (2013.01)

(58) Field of Classification Search
CPC ....... C08L 13/00; C08L 33/18; C08L 15/005; C08L 39/02

USPC ............................................... 525/217, 328.2
See application file for complete search history.

(56) References Cited

U.S. PATENT DOCUMENTS

| 5,859,155 | A | 1/1999 | Furihata et al. |
| 6,657,014 | B1 | 12/2003 | Mori et al. |
| 7,642,028 | B2 * | 1/2010 | Wu et al. ........... 430/58.2 |
| 2007/0037930 | A1 | 2/2007 | Odagawa et al. |

FOREIGN PATENT DOCUMENTS

| CN | 1860171 A | 11/2006 |
| JP | A-7-305276 | 11/1995 |
| JP | A-7-316525 | 12/1995 |
| JP | A-10-30035 | 2/1998 |
| JP | A-2001-55471 | 2/2001 |
| JP | A-2007-63429 | 3/2007 |
| JP | A-2007-262136 | 10/2007 |

OTHER PUBLICATIONS

International Search Report issued in International Patent Application No. PCT/JP2012/079760 mailed Dec. 11, 2012.

* cited by examiner

*Primary Examiner* — Nathan M Nutter
(74) *Attorney, Agent, or Firm* — Oliff PLC

(57) ABSTRACT

A nitrile rubber composition containing a carboxyl group-containing nitrile rubber and an allylamine-based polymer which contains units expressed by the following general formula (1) is provided.

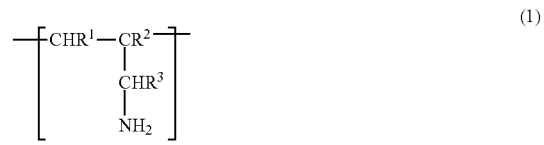

(1)

(In the general formula (1), $R^1$, $R^2$, and $R^3$ respectively independently are one selected from a group including a hydrogen atom, alkyl group containing 1 to 4 carbon atoms which may have substituents, aryl group containing 6 to 12 carbon atoms which may have substituents, and halogen atom.).

8 Claims, No Drawings

NITRILE RUBBER COMPOSITION AND CROSS-LINKED RUBBER

TECHNICAL FIELD

The present invention relates to a nitrite rubber composition which is able to give cross-linked rubber which is excellent in tensile stress, oil resistance, cold resistance, and compression set resistance and to cross-linked rubber which is obtained by using the nitrile rubber composition.

BACKGROUND ART

Since the past, nitrile rubber (acrylonitrile-butadiene copolymer rubber), taking advantage of its oil resistance, mechanical properties, chemical resistance, etc., has been used as a material for hoses, tubes, and other rubber parts for automobiles. Further, hydrogenated nitrile rubber (hydrogenated acrylonitrile-butadiene copolymer rubber) which is obtained by hydrogenating the carbon-carbon double bonds in the polymer main chain of nitrile rubber is further excellent in heat resistance, so is used for seals, belts, hoses, diaphrams, and other rubber parts.

To deal, with this situation, Patent Document 1 proposes a nitrile rubber composition which contains a hydrogenated nitrile rubber having $\alpha,\beta$-ethylenically unsaturated dicarboxylic acid mono ester monomer units, a polyamine-based cross-linking agent, and a basic cross-linking accelerator. Using this composition, cross-linked rubber which is excellent in heat resistance, bending fatigue resistance, etc. and is small in compression set is obtained.

On the other hand, in recent years, the market demands on quality have become more sophisticated. In particular, in industrial belts etc., higher load bearing performance is being designed for, so cross-linked rubber with large tensile stress has become sought. However, the cross-linked rubber obtained by cross-linking the nitrile rubber composition which is described in Patent Document 1 is not necessarily sufficient in tensile stress. To deal with the higher demands on load bearing performance in recent years, further improvement in tensile stress has been sought.

PRIOR ART DOCUMENTS

Patent Documents

Patent Document 1: Japanese Patent Publication No. 2001-55471A

SUMMARY OF THE INVENTION

Problem to be Solved by the Invention

The present invention has as its object the provision of a nitrite rubber composition which can give cross-linked rubber which is excellent in tensile stress, oil resistance, cold resistance, and compression set resistance and cross-linked rubber which is obtained by using that nitrile rubber composition.

Means for Solving the Problems

The present inventors etc. engaged in in-depth research to achieve the above object and as a result discovered that by blending into a carboxyl group-containing nitrile rubber a specific allylamine-based polymer, the above object can be achieved and thereby completed the present invention.

That is, according to the present invention, there is provided a nitrile rubber composition which contains a carboxyl group-containing nitrile rubber and an allylamine-based polymer which contains units which are expressed by the following general formula (1).

(In the general formula (1), $R^1$, $R^2$, and $R^3$ respectively independently are one selected from a group comprised of a hydrogen atom, alkyl group containing 1 to 4 carbon atoms which may have substituents, aryl group containing 6 to 12 carbon atoms which may have substituents, and halogen atom.)

In the present invention, preferably in the general formula (1), $R^1$, $R^2$, and $R^3$ are hydrogen atoms.

In the present invention, preferably the allylamine-based polymer is a polymer which is comprised of only units expressed by the general formula (1).

In the present invention, preferably the allylamine-based polymer has a weight average molecular weight (Mw) of 300 to 60,000,000.

In the present invention, preferably a ratio of content of the allylamine-based polymer with respect to 100 parts by weight of the carboxyl group-containing nitrile rubber is 0.1 to 20 parts by weight.

In the present invention, preferably the carboxyl group-containing nitrile rubber contains mono n-butyl maleate monomer units.

In the present invention, preferably the carboxyl group-containing nitrile rubber has an iodine value of 120 or less.

Further, according to the present invention, there is provided a cross-linked rubber obtained by cross-linking the above nitrile rubber composition.

Effects of the Invention

According to the present invention, it is possible to provide a nitrile rubber composition which can give cross-linked rubber which is excellent in tensile stress, oil resistance, cold resistance, and compression set resistance and to provide cross-linked rubber which is obtained by using that nitrile rubber composition.

DESCRIPTION OF EMBODIMENTS

Nitrile Rubber Composition

The nitrile rubber composition of the present invention contains a carboxyl group-containing nitrile rubber and a later explained specific allylamine-based polymer.

Carboxyl Group-Containing Nitrile Rubber

First, the carboxyl group-containing nitrile rubber used in the present invention will be explained. The carboxyl group-containing nitrile rubber used in the present invention is rubber which is obtained by copolymerizing an $\alpha,\beta$-ethylenically unsaturated nitrile monomer, a carboxyl group-containing monomer, and, added as needed, a copolymerizable other monomer.

The $\alpha,\beta$-ethylenically unsaturated nitrile monomer is not particularly limited so long as being an $\alpha,\beta$-ethylenically unsaturated compound which has nitrile groups. For example, acrylonitrile; α-chloroacrylonitrile, α-bromoacrylonitrile, and other α-halogenoacrylonitriles; methacrylonitrile and other α-alkylacrylonitriles; etc. way be mentioned. Among these as well, acrylonitrile and methacrylonitrile are preferable, while acrylonitrile is more preferable. The α,β-ethylenically unsaturated nitrile monomer may be a single type alone or a plurality of types used together.

The content of the α,β-ethylenically unsaturated nitrile monomer units is preferably 5 to 60 wt % with respect to the total monomer units, more preferably 10 to 55 wt %, furthermore preferably 15 to 50 wt %. If the content of the α,β-ethylenically unsaturated nitrile monomer units is too small, the obtained cross-linked rubber is liable to fall in oil resistance, while conversely if too large, the cold resistance may fall.

The carboxyl group-containing monomer is not particularly limited so long as it can be copolymerized with an α,β-ethylenically unsaturated nitrile monomer and has at least one unsubstituted (free) carboxyl group which is not esterified etc. By using a carboxyl group-containing monomer, carboxyl groups can be introduced into the nitrile rubber.

As the carboxyl group-containing monomer used in the present invention, for example, an α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, a "carboxyl group-containing monomer" also includes a monomer in which the carboxyl groups of these monomers form carboxylates. Furthermore, at anhydride of an α,β-ethylenically unsaturated polyvalent carboxylic acid also causes the acid anhydride groups to cleave apart after copolymerization to form carboxyl groups, so can be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, fumaric acid, maleic acid and other butenedioic acid, itaconic acid, citraconic acid, mesaconic acid, glutaconic acid, allylmalonic acid, teraconic acid, etc. may be mentioned. Further, as the anhydride of an α,β-unsaturated polyvalent carboxylic acid, maleic anhydride, itaconic anhydride, citraconic anhydride, etc. may be mentioned.

As the α,β-ethylenically unsaturated dicarboxylic acid monoester monomer, monomethyl maleate, monoethyl maleate, monopropyl maleate, mono n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

The carboxyl group-containing monomer may be used as a single type alone or as a plurality of types combined. Among these, since the effect of the present invention becomes much more remarkable, an α,β-ethylenically unsaturated dicarboxylic acid mono ester monomer is preferable, while a maleic acid monoalkyl ester is more preferable, and mono n-butyl maleate is particularly preferable. Note that, the number of carbon atoms of the alkyl groups of the maleic acid monoalkyl ester is preferably 2 to 8.

The content of the carboxyl group-containing monomer units is preferably 0.1 to 20 wt % with respect to the total monomer units, more preferably 0.2 to 15 wt %, furthermore preferably 0.5 to 10 wt %. If the content of the carboxyl group-containing monomer units is too small, the obtained cross-linked rubber is liable to deteriorate in mechanical strength and compression set resistance, while conversely if too large, the nitrile rubber composition is liable to deteriorate in scorch stability or the obtained cross-linked rubber is liable to fall in fatigue resistance.

Further, the carboxyl group-containing nitrile rubber used in the present invention is preferably one which is copolymerized, in addition to the α,β-ethylenically unsaturated nitrile monomer and carboxyl group-containing monomer, a conjugated diene monomer, from the viewpoint of the obtained cross-linked product expressing rubber elasticity.

As the conjugated diene monomer which forms the conjugated diene monomer units, 1,3-butadiene, isoprene, 2,3-dimethyl-1,3-butadiene, 1,3-pentadiene, chloroprene, and other conjugated diene monomers containing 4 to 6 carbon atoms are preferable, 1,3-butadiene and isoprene are more preferable, and 1,3-butadiene is particularly preferable. The conjugated diene monomer may be used as a single type alone or as a plurality of types together.

The content of the conjugated diene monomer units is preferably 20 to 94.9 wt % with respect to the total monomer units, more preferably 30 to 89.8 wt %, furthermore preferably 40 to 84.5 wt %. If the content of the conjugated diene monomer units is too small, the obtained cross-linked rubber is liable to fall in rubbery elasticity, while, conversely, if too large, the heat resistance and the chemical resistance stability may be impaired. Note that, the content of the conjugated diene monomer units, in the case of performing hydrogenation explained later, is a content which also contains the hydrogenated parts.

Further, the carboxyl group-containing nitrile rubber used in the present invention may be copolymerized together with the α,β-ethylenically unsaturated nitrile monomer, carboxyl group-containing monomer, and conjugated diene monomer, other monomer which can be copolymerized with these. As such other monomer, ethylene, an α-olefin monomer, aromatic vinyl monomer, α,β-ethylenically unsaturated carboxylic acid ester monomer (except one corresponding to the above-mentioned "carboxyl group-containing monomer"), fluorine-containing vinyl monomer, copolymerizable anti-aging agent, etc. may be illustrated.

As the α-olefin monomer, one with 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinylpyridine, etc. may be mentioned.

As the α,β-ethylenically unsaturated carboxylic acid ester monomer, for example, methyl acrylate, ethyl acrylate, n-butyl acrylate, n-dodecyl acrylate, methyl methacrylate, ethyl methacrylate, and other (meth)acrylic acid esters (abbreviation for "methacrylic acid esters and acrylic acid esters", same below) which have alkyl groups with 1 to 18 carbon atoms; methoxymethyl acrylate, methoxyethyl acrylate, methoxyethyl methacrylate, and other (meth)acrylic acid esters which have alkoxyalkyl groups with 2 to 12 carbon atoms; α-cyanoethyl acrylate, α-cyanoethyl methacrylate, α-cyanobutyl methacrylate, and other (meth)acrylic acid esters which have cyanoalkyl groups with 2 to 12 carbon atoms; 2-hydroxyethyl acrylate, 2-hydroxypropyl acrylate, 2-hydroxyethyl methacrylate, and other (meth)acrylic acid esters which have hydroxyalkyl groups with 1 to 12 carbon atoms; trifluoroethyl acrylate, tetrafluoropropyl methacrylate, and other (meth)acrylic acid esters which have fluoroalkyl groups with 1 to 12 carbon atoms; dimethyl maleate, diethyl fumarate, dimethyl itaconate, diethyl itaconate, and other α,β-ethylenically unsaturated dicarboxylic acid dialkyl esters; dimethylaminomethyl acrylate, diethylaminoethyl acrylate, and other dialkylamino group-containing α,β-ethylenically unsaturated carboxylic acid esters; etc. may be mentioned.

As the fluorine-containing vinyl monomer, for example, fluoroethylvinyl ether, fluoropropylvinyl ether, o-trifluoromethyl styrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, etc. may be mentioned.

These copolymerizable other monomers may also be used as a plurality of types together. The content of the units of the other monomers is preferably 50 wt % or less with respect to the total monomer units, more preferably 30 wt % or less, furthermore preferably 10 wt % or less.

The carboxyl group-containing nitrile rubber has an iodine value of preferably 120 or less, more preferably 60 or less, furthermore preferably 40 or less, particularly preferably 30 or less. If making the iodine value 120 or less, the obtained cross-linked rubber can be improved in heat resistance and ozone resistance.

Note that, below, a carboxyl group-containing nitrile rubber with an iodine value of 120 or less will sometimes be referred to as a "carboxyl group-containing highly saturated nitrile rubber".

The carboxyl group-containing nitrile rubber has a polymer Mooney viscosity ($ML_{1+4}$, 100° C.) of preferably 5 to 200, more preferably 10 to 150, particularly preferably 10 to 100. If the carboxyl group-containing nitrile rubber is too low in polymer Mooney viscosity, the obtained cross-linked rubber is liable to fall in mechanical properties, while conversely if too high, the nitrile rubber composition may fall in processability.

Further, the content of the carboxyl groups in the carboxyl group-containing nitrile rubber, that is, the number of moles of carboxyl groups per 100 g of the carboxyl group-containing nitrite rubber, is preferably $5 \times 10^{-4}$ to $5 \times 10^{-1}$ ephr, more preferably $1 \times 10^{-3}$ to $1 \times 10^{-1}$ ephr, particularly preferably $5 \times 10^{-3}$ to $6 \times 10^{-2}$ ephr. If the carboxyl group-containing nitrile rubber is too low in content of carboxyl groups, the obtained cross-linked rubber is liable to fall in mechanical properties, while if too large, the cold resistance may fall.

The method of production of the carboxyl group-containing nitrile rubber of the present invention is not particularly limited, but it is preferable to produce it by using emulsion polymerization using an emulsifying agent so as to copolymerize the above-mentioned monomers to prepare a latex of copolymer rubber. At the time of emulsion polymerization, an emulsifying agent, polymerization initiator, molecular weight adjuster, or other usually used secondary polymerization material may be used.

The emulsifying agent is not particularly limited, but, for example, polyoxyethylenealkyl ether, polyoxyethylenealkylphenol ether, polyoxyethylenealkyl ester, polyoxyethylenesorbitanalkyl ester, and other nonionic emulsifying agent; a salt of myristic acid, palmitic acid, oleic acid, linoleic acid, and other fatty acid, sodium dodecylbenzene sulfonate and other alkylbenzene sulfonate, higher alcohol sulfuric ester salt, alkyl sulfosuccinic acid salt, and other anionic emulsifying agent; sulfoester of α,β-unsaturated carboxylic acid, sulfate ester of α,β-unsaturated carboxylic acid, sulfoalkyl arylether, and other copolymerizable emulsifying agent; etc. may be mentioned. The amount of use of the emulsifying agent is preferably 0.1 to 10 parts by weight with respect to 100 parts by weight of the total monomers.

The polymerization initiator is not particularly limited if a radical initiator, but potassium persulfate, sodium persulfate, ammonium persulfate, potassium perphosphate, hydrogen peroxide, and other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butyl peroxyisobutyrate, and other organic peroxides; azobisisobutyronitrile, azobis-2,4-dimethyl valeronitrile, azobiscyclohexane carbonitrile, methyl azobisisobutyrate, and other azo compounds; etc. may be mentioned. The polymerization initiator may be used alone or as two types or more combined. As the polymerization initiator, an inorganic or organic peroxide is preferable. When using the peroxide as the polymerization initiator, it may be combined with sodium hydrogen sulfite, ferrous sulfate, and other reducing agents for use as a redox-based polymerization initiator. The amount of use of the polymerization initiator is preferably 0.01 to 2 parts by weight with respect to 100 parts by weight of the total monomers.

The molecular weight adjuster is not particularly limited, but t-dodecyl mercaptan, n-dodecyl mercaptan, octyl mercaptan, and other mercaptans; carbon tetrachloride, methylene chloride, methylene bromide, and other halogenated hydrocarbon; α-methylstyrene dimer; tetraethylthiuram disulfide, dipentamethylene thiuram disulfide, diisopropyl xantogen disulfide, and other sulfur-containing compounds etc. may be mentioned. These may be used alone or in two or more types combined. Among these as well, mercaptans are preferable, and t-dodecyl mercaptan is more preferable. The amount of use of the molecular weight adjuster is preferably 0.1 to 0.8 part by weight with respect to 100 parts by weight of the total monomers.

For the medium of the emulsion polymerization, usually, water is used. The amount of water is preferably 80 to 500 parts by weight with respect to 100 parts by weight of the total monomers.

At the time of emulsion polymerisation, further, in accordance with need, a stabilizer, dispersant, pH adjuster, deoxidant, particle size adjuster, and other secondary polymerization material may be used. In the case of using these, the types and amounts of use are also not particularly limited.

Note that, when the copolymer obtained by copolymerization has an iodine value higher than 120, it is also possible to hydrogenate the copolymer (perform a hydrogen addition reaction) so as to make the iodine value 120 or less. In this case, the method of hydrogenation is not particularly limited. A known method may be employed.

Allylamine-Based Polymer

The nitrile rubber composition of the present invention contains, in addition to the above-mentioned carboxyl group-containing nitrile rubber, an allylamine-based polymer which contains units expressed by the following general formula (1) (below, abbreviated as "allylamine-based polymer").

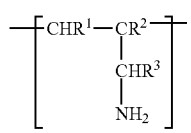

(1)

In the general formula (1), $R^1$, $R^2$, and $R^3$ respectively independently are one selected from a group comprised of a hydrogen atom, alkyl group containing 1 to 4 carbon atoms which may have substituents, aryl group containing 6 to 12 carbon atoms which may have substituents, and halogen atom. Preferably, among $R^1$, $R^2$, and $R^3$, at least one is a hydrogen atom, particularly preferably all of $R^1$, $R^2$, and $R^3$ are hydrogen atoms.

The allylamine-based polymer used in the present invention acts as a cross-linking agent for making the above-mentioned carboxyl group-containing nitrile rubber cross-link. In the present invention, by using the allylamine-based polymer as a cross-linking agent, the obtained cross-linked product can be made excellent in tensile stress, oil resistance, cold resistance, and compression set resistance.

Note that, the allylamine-based polymer used in the present invention need only be one which has units expressed by the general formula (1). For example, it may be a homopolymer of the allylamine-based monomer expressed by the following general formula (2) or a block polymer or random polymer of the allylamine-based monomer expressed by the following general formula (2) and a monomer which can copolymerize with this, but from the view of the larger effect of addition, a homopolymer of an allylamine-based monomer or a block polymer of an allylamine-based monomer and a copolymerizable monomer is preferable. That is, in the present invention, one which has units expressed by the following general formula (3) is preferable.

(2)

(in which general formula (2), $R^1$, $R^2$, and $R^3$ are similar to the general, formula (1))

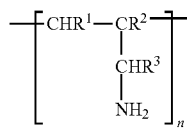

(3)

In the general formula (3), $R^1$, $R^2$, and $R^3$ are similar to the general formula (1) and, in the same way as the general formula (1), all of $R^1$, $R^2$, and $R^3$ are particularly preferably hydrogen atoms. That is, as the allylamine-based polymer used in the present invention, one which contains units expressed by the following general, formula (4) is particularly preferable.

(4)

In the general formula (3) and general formula (4), "n" is an integer of 5 to 1,000,000, preferably an integer of 5 to 100,000, more preferably 10 to 10,000, particularly preferably 15 to 1,000. By "n" being in the above range, it is possible to make the processability at the time of kneading better.

The allylamine-based polymer used in the present invention is not particularly limited in weight average molecular weight (Mw), but preferably it is 300 to 60,000,000, more preferably 300 to 6,000,000, furthermore preferably 600 to 600,000, particularly preferably 800 to 60,000. If the weight average molecular weight is in the above range, if is possible to improve the processability at the time of kneading.

Further, the allylamine-based polymer used in the present invention has a ratio of content of the units expressed by the general formula (1) of preferably 50 wt % or more, more preferably 70 wt % or more, and has a ratio of content of units expressed by the general formula (1) of particularly preferably 100 wt %. That is, the allylamine-based polymer used in the present invention is particularly preferably one which is comprised of only the units expressed by the general formula (1) (that is, the homopolymer of the allylamine-based monomer expressed by the general formula (2)).

The allylamine-based polymer used in the present invention is, for example, produced by placing the allylamine-based monomer expressed by the general formula (2), if necessary, in the copresence of a monomer which can copolymerize with the allylamine-based monomer to thereby polymerize it by the method which is disclosed in Japanese Patent Publication No. 2-14364B2, Japanese Patent Publication No. 2001-253905A, Japanese Patent Publication No. 2010-47688A, etc.

As the allylamine-based monomer, monoallylamine (same as 2-propen-1-amine), 3-methyl-2-propen-1-amine, 3-ethyl-2-propen-1-amine, 3-butyl-2-propen-1-amine, 3-phenyl-2-propen-1-amine, 3-tolyl-2-propen-1-amine, 3-chloro-2-propen-1-amine, 3-bromo-2-propen-1-amine, 2-methyl-2-propen-1-amine, 2-ethyl-2-propen-1-amine, 2-butyl-2-propen-1-amine, 2-phenyl-2-propen-1-amine, 2-tolyl-2-propen-1-amine, 2-chloro-2-propen-1-amine, 2-bromo-2-propen-1-amine, etc. may be mentioned, but since the effect of the present invention becomes much more remarkable, monoallylamine is preferable.

As the monomer which can copolymerize with the allylamine-based monomer, vinylpyrrolidone, β-methacryloyloxyethyltrimethylammonium chloride, dimethylaminoethyl methacrylate, methylvinylketone, acrylamide, acrylonitrile, methacrylonitrile, styrene, hydroxyethyl acrylate, acrylic acid, methacrylic acid, vinyl chloride, vinyl isocyanate, methylvinylether, vinylpyridine, acrolein, methyl acrylate, methyl methacrylate, etc. may be mentioned.

Further, in the nitrile rubber composition of the present invention, the amount of the allylamine-based polymer is preferably 0.1 to 20 parts by weight with respect to 100 parts by weight of the carboxyl group-containing nitrile rubber, more preferably 0.2 to 15 parts by weight, furthermore preferably 0.5 to 10 parts by weight. If making the amount of the allylamine-based polymer in the above range, the cross-linked product can be made excellent in tensile stress, oil resistance, cold resistance, and compression set resistance.

Basic Cross-Linking Accelerator

The nitrile rubber composition of the present invention may further contain a basic cross-linking accelerator. By further including a basic cross-linking accelerator, the compression set resistance can be further improved.

As specific examples of the basic cross-linking accelerator, 1,8-diazabicyclo[5,4,0]undecene-7 (below, sometimes abbreviated as "DBU") and 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methyl imidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, and other basic cross-linking accelerators which have cyclic amidine structures; tetramethylguanidine, tetraethylguanidine, diphenylguanidine, 1,3-di-o-tolylguanidine, tolylguanidine, o-tolylbiguanide, and other guanidine-based basic cross-linking accelerators; n-butylaldehyde aniline, acetoaldehyde ammonia, and other aldehydeamine-based basic cross-linking accelerators; etc. my be mentioned. Among these as well, guanidine-based basic cross-linking accelerators and basic cross-linking accelerators which have cyclic amidine structures are preferable, while 1,3-di-o-tolylguanidine and 1,8-diazabicyclo[5,4,0]undecene-7 are particularly preferable. Note that, the basic cross-linking accelerators which have cyclic amidine structures may form salts with organic carboxylic acids or alkyl phosphoric acids etc.

In the nitrile rubber composition of the present invention, the amount of the basic cross-linking accelerator is preferably 0.1 to 20 parts by weight with respect to 100 parts by weight of the carboxyl group-containing nitrile rubber, more preferably 0.2 to 15 parts by weight, furthermore preferably 0.5 to 10 parts by weight. By making the amount of the basic cross-linking accelerator in the above range, the effect of improvement of the compression set resistance can be raised more.

Other Compounding Agents

Further, the nitrile rubber composition of the present invention may have blended into it, in addition to the above-mentioned ingredients, other compounding agents which are usually used in the field of rubber processing. As such compounding agents, for example, a reinforcing agent, filler, plasticizer, antioxidant, photostabilizer, scorch preventer, processing aid, slip agent, tackifier, lubricant, flame retardant, acid acceptor, antifungal agent, antistatic agent, coloring agent, silane coupling agent, co-cross-linking agent, cross-linking aid, cross-linking retardant, foam agent, etc. may be mentioned. As the amounts of these compounding agents, amounts according to the purposes of inclusion may be suitably employed.

Note that, the nitrile rubber composition of the present invention any have blended into it a rubber other than the above-mentioned carboxyl group-containing nitrile rubber in a range not impairing the effects of the present invention.

As such a rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluororubber, natural rubber, polyisoprene rubber, etc. may be mentioned.

The amount of the rubber other than carboxyl group-containing nitrile rubber in the nitrile rubber composition when mixing it in is preferably 60 parts by weight or less with respect to 100 parts by weight of the carboxyl group-containing nitrile rubber, more preferably 30 parts by weight or less, furthermore preferably 10 parts by weight or less.

Further, the nitrile rubber composition of the present invention may have blended in it a cross-linking agent other than the above-mentioned allylamine-based polymer in a range not impairing the effect of the present invention. The cross-linking agent is not particularly limited, but a sulfur-based cross-linking agent, organic peroxide-based cross-linking agent, polyamine-based cross-linking agent (except an allylamine-based polymer), etc. may be mentioned.

The nitrile rubber composition of the present invention is prepared by mixing these ingredients. As the method for suitably preparing the nitrile rubber composition of the present invention, kneading the ingredients, except for the allylamine-based polymer and other ingredients which are thermally unstable, by a Bambury mixer, internal mixer, kneader, or other mixing machine for primary kneading, then transferring the mixture to an open roll etc. and adding the allylamine-based polymer or cross-linking accelerator or other thermally unstable ingredients for secondary kneading etc. may be mentioned. Note that, the primary kneading is usually performed at temperature of 10 to 200° C., preferably 30 to 180° C. for 1 minute to 1 hour, preferably 1 minute to 30 minutes, while the secondary kneading is usually performed at temperature of 10 to 100° C., preferably 20 to 60° C. for 1 minute to 1 hour, preferably 1 minute to 30 minutes.

The nitrile rubber composition of the present invention has a compound Mooney viscosity ($ML_{1+4}$, 100° C.) of preferably 5 to 200, more preferably 10 to 150, particularly preferably 15 to 140.

Cross-Linked Rubber

The cross-linked rubber of the present invention is obtained by cross-linking the above-mentioned nitrile rubber composition of the present invention.

The cross-linked rubber of the present invention may be produced by using the nitrile rubber composition of the present invention, shaping it by for example a molding machine corresponding to the desired shape such as an extruder, injection molding machine, compressor, roll, etc., heating it to perform a cross-linking reaction, and fixing the shape as a cross-linked product. In this case, it is possible to perform the cross-linking after the preliminary shaping or perform the cross-linking simultaneously with the shaping. The shaping temperature is usually 10 to 200° C., preferably 25 to 120"C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the cross-linked rubber, sometimes even if the surface is cross-linked, the inside will not be sufficiently cross-linked, so the rubber may be further heated for secondary cross-linking.

As the heating method, press heating, steam heating, oven heating, hot air heating, and other general methods which are used for cross-linking rubber may be suitably selected.

The thus obtained cross-linked rubber of the present invention is obtained by using the above-mentioned rubber composition of the present invention, so is excellent in tensile stress, oil resistance, cold resistance, and compression set resistance (compression set resistance when made into a disk shaped article and when made into an O-ring shaped article).

For this reason, the cross-linked rubber of the present invention can be used, taking advantage of the above characteristics, for O-rings, packings, diaphragms, oil seals, shaft seals, bearing seals, wellhead seals, air compressor seals, seals for sealing the chlorofluorocarbon or fluorohydrocarbons or carbon dioxide used for cooling apparatuses of air-conditioners or compressors for cooling machines for air-conditioning systems, seals for sealing supercritical carbon dioxide or subcritical carbon dioxide used for washing media for precision washing, seals for roller devices (roller bearings, automobile hub units, automobile water pumps, linear guide devices, ball, and screws, etc.), valves and valve seats, BOP (blow out preventers), blatters, and other various sealing members; and intake manifold gaskets attached to connecting parts of intake manifolds and cylinder heads, cylinder head gaskets attached to connecting parts of cylinder blocks and cylinder heads, rocker cover gaskets attached to connecting parts of rocker covers and cylinder heads, oil pan gaskets attached to connecting parts of oil pans and cylinder blocks or transmission cases, gaskets for fuel cell separators attached between a pair of housings sandwiching a unit cell provided with anode, electrolyte plates, and cathodes, gaskets for top covers of hard disk drives, and other various types of gaskets; printing roils, ironmaking rolls, papermaking rolls, industrial rolls, office equipment rolls, and other various types of rolls; flat belts (film core flat belts, cord flat belts, maltilayer flat belts, single piece flat belts, etc.), V-belts (wrapped V-belts, low edge V-belts, etc.), V-ribbed belts (single V-ribbed, belts, double V-ribbed belts, wrapped V-ribbed belts, back surface rubber V-ribbed belts, top cog V-ribbed belts etc.), CVT belts, timing belts, toothed belts, conveyor belts, oil immersed belts, and other various types or belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flowlines, and other various types of hoses; CVJ boots, propeller shaft boots, constant velocity joint boots, rack and pinion boots, and other various types of boots; cushion materials, dynamic dampers, rubber couplings, air springs, vibration proofing materials, and other damping material rubber parts; dust covers, car interior members, tires, covered cables, shoe soles, electromagnetic wave shields, binders for flexible printed circuit boards and other binders, fuel cell separators, and also other broad applications in the fields of cosmetics and pharmaceuticals, fields in contact with food, the electronics field, etc. Among these as well, the cross-linked rubber of the present invention can be suitably used for seal materials, belts, hoses, or gaskets and can be particularly suitably used for belts.

EXAMPLES

Below, the present invention will be explained based on more detailed examples, but the present invention is not limited to these examples. Note that, below, "parts" are based on weight unless otherwise indicated. Further, the tests and evaluations were conducted as follows.

Composition of Carboxyl Group-Containing (Highly Saturated) Nitrile Rubber

The ratios of content of the monomer units which form the carboxyl group-containing (highly saturated) nitrile rubber were measured by the following method.

That is, the ratio of content of the mono n-butyl maleate units was calculated by adding 2-butanone 100 ml to 2 mm square carboxyl group-containing nitrile rubber 0.2 g and stirring for 16 hours, then adding ethanol 20 ml and water 10 ml and, while stirring, using a 0.02N hydrous ethanol solution of potassium hydroxide for titration at room temperature by Thymolphthalein as an indicator to thereby find the number of moles of the carboxyl groups to the carboxyl group-containing nitrile rubber 100 g, and converting the number of moles which were found to the amount of mono n-butyl maleate units.

The ratio of content of the 1,3-butadiene units (including hydrogenated parts) was calculated by measuring the iodine value (according to JIS K 6235) using the carboxyl group-containing nitrile rubber before a hydrogenation reaction.

The ratio of content of the acrylonitrile units was calculated by measuring the content of nitrogen in the carboxyl group-containing nitrile rubber by the Kjeldahl method in accordance with JIS K6383.

Iodine Value

The carboxyl group-containing (highly saturated) nitrile rubber was measured for iodine value in accordance with JIS K 6235.

Mooney Viscosity (Polymer Mooney and Compound Mooney)

The carboxyl group-containing (highly saturated) nitrile rubber and the rubber composition were measured for Mooney viscosity (polymer Mooney and compound Mooney) in accordance with JIS K6300-1 (units: [$ML_{1+4}$, 100° C.]).

Cross-Linkability Test

The nitrile rubber composition was subjected to a cross-linkability test using a rubber vulcanization tester (Moving Die Rheometer MDR, made by Alpha Technologies) at 170° C. for 30 minutes. Further, from the results of the cross-linkability test, the lowest torque "ML" (units: dN·m), the highest torque "MH" (units: dN·m), $T_{10}$ (units: min), $T_{50}$ (units: min), and $T_{90}$ (units: min) were measured. Note that, $T_{10}$, $T_{50}$, and $T_{90}$ respectively mean the time which is required for the torque to rise by 10% from the lowest torque ML when designating "highest torque MH—lowest torque ML" as 100%, the time which is required for the torque to rise by 50%, and the time which is required for the torque to rise by 90%. The smaller the value of $T_{90}$, the better the cross-linking speed.

Normal Physical Properties (Tensile Strength, Tensile Stress, and Hardness)

The nitrile rubber composition was placed in a vertical 15 cm, horizontal 15 cm, depth 0.2 cm mold and pressed by a press pressure of 10 MPa while heating at 170° C. for 20 minutes for press forming to obtain a sheet-shaped cross-linked product. Next, the obtained cross-linked product was transferred to a gear type oven where it was secondarily cross-linked at 170° C. for 4 hours. The obtained sheet-shaped cross-linked rubber was punched to No. 3 type dumbbell shapes to prepare test pieces. Further, the obtained test pieces were used in accordance with JIS K6251 to measure the cross-linked rubber for tensile strength and tensile stress (20% tensile stress, 50% tensile stress, and 100% tensile stress) and further in accordance with JIS K6253 using a Durometer hardness tester (type A) to measure the cross-linked rubber for hardness.

Cold Resistance Test (TR Test)

The same procedure was followed as with the evaluation of the normal physical properties to obtain a sheet-shaped cross-linked rubber, then in accordance with JIS K6261, the cold resistance was measured by a TR test (low temperature elasticity recovery test). TR10 (units: ° C.) is the indicator of the cold resistance. The lower this value, the better the cold resistance can be judged.

Fuel Oil Immersion Test (Fuel B and Fuel C)

The same procedure as in the evaluation of the above-mentioned normal physical properties was performed to obtain sheet-shaped cross-linked rubber, then the cross-linked product was immersed in test fuel oil adjusted to 40° C. (Fuel B and Fuel C, where the Fuel B is a mixture of a volume ratio of isooctane:toluene=70:30, while the Fuel C is a mixture of a volume of isooctane:toluene=50:50) for 72 hours in accordance with JIS K6258 to thereby perform a fuel oil immersion test.

Note that, in the fuel oil immersion test, the volume of the cross-linked rubber before and after oil immersion was measured and the volume swelling ΔV after oil immersion (units: %) was calculated in accordance with "ΔV=([volume after fuel oil immersion−volume before fuel oil immersion]/volume before fuel oil immersion)×100". The smaller the volume swelling ΔV, the better the oil resistance.

Disk Compression Set Test

Using an inside diameter 29 mm, depth 12.5 mm mold, the nitrile rubber composition was cross-linked at 170° C. for 20 minutes at a press pressure of 10 MPa to obtain primary cross-linked test pieces for a disk set test. Furthermore, part of the obtained test pieces were secondarily cross-linked at 170° C. for 4 hours to obtain secondarily cross-linked test piece for disk set test. Further, the obtained primary cross-linked test piece and secondarily cross-linked test piece were used to measure the disk compression set in accordance with JIS K6262 under conditions of the each test piece sandwiched between two flat surfaces at a distance compressed 25% in the thickness direction held at 150° C. for 72 hours. The smaller this value, the better the compression set resistance.

O-Ring Compression Set Test

Using an inside diameter 30 mm, ring diameter 3 mm mold, the nitrile rubber composition was cross-linked at 170° C. for 20 minutes under a press pressure of 5 MPa and was secondarily cross-linked, at 170° C. for 4 hours to obtain a test piece for an O-ring set test. Further, the obtained test piece was used to measure the O-ring compression set in accordance with JIS K6262 under conditions of the O-ring shaped test piece sandwiched between two flat surfaces at a distance compressed 25% in the ring thickness direction held at 150° C. for 72 hours. The smaller this value, the better the compression set resistance.

Synthesis Example 1

To a reactor, ion exchanged water 180 parts, concentration 10 wt % sodium dodecylbenzene sulfonate aqueous solution 25 parts, acrylonitrile 37.0 parts, mono n-butyl maleate 4 parts, and t-dodecyl mercaptan (molecular weight adjuster) 0.5 part were successively charged. The inside gas was replaced with nitrogen three times, then 1,3-butadiene 57 parts was charged. The reactor was held at 5° C., then cumen hydroperoxide (polymerization initiator) 0.1 part was charged. While stirring, the polymerization reaction was continued. At the points of time in the middle when the polymerization conversion rate reached 40% and 60%, 1 part of mono n-butyl maleate was added respectively and the polymerization reaction continued for 16 hours. Next, concentration 10 wt % hydroquinone aqueous solution (polymerization terminator) 0.1 part was added to stop the polymerization reaction, then a water temperature 60° C. rotary evaporator was used to remove the residual monomers and obtain a latex (L1) of carboxyl group-containing nitrile rubber (solid content concentration: about 30 wt %).

Next, two volumes of methanol was added to the obtained latex (L1) to coagulate it, then the result was filtered to obtained solids (crumbs). The crumbs were vacuum dried at 60° C. for 12 hours to thereby obtain carboxyl group-containing nitrile rubber (R1). The carboxyl group-containing nitrile rubber (R1) had a polymer Mooney viscosity [$ML_{1+4}$, 100° C.] of 12. Further, the ratios of contents of the monomer units which formed the obtained carboxyl group-containing nitrile rubber (R1) were acrylonitrile units 36.7 wt %, mono n-butyl maleate units 5.7 wt %, and 1,3-butadiene units 57.6 wt %.

Synthesis Example 2

To make the content of palladium 1,000 ppm with respect to the dry weight of rubber contained in the latex (L1) of the carboxyl group-containing nitrile rubber which was obtained by the same procedures as in the Synthesis Example 1, the autoclave was charged with the latex (L1) and a palladium catalyst (solution of mixture of 1 wt % palladium acetate solution and equal weight of ion exchanged water) and a hydrogen addition reaction was performed at a hydrogen pressure of 3 MPa and temperature of 50° C. for 6 hours to obtain a latex (L2) of carboxyl group-containing highly saturated nitrile rubber.

Further, two volumes of methanol was added to the obtained latex (L2) to coagulate it, then the result was filtered to obtained solids (crumbs). The crumbs were vacuum dried at 60° C. for 12 hours to thereby obtain carboxyl group-containing highly saturated nitrile rubber (R2). The carboxyl group-containing highly saturated nitrile rubber (R2) had an iodine value of 6.5 and a Polymer Mooney viscosity [$ML_{1+4}$, 100° C.] of 40. The ratios of content of the monomer units forming the carboxyl group-containing highly saturated nitrile rubber (R2) were acrylonitrile units 35.7 wt %, mono n-butyl maleate units 5.7 wt %, and 1,3-butadiene units (including hydrogenated parts) 58.6 wt %.

Example 1

Using a Bambury mixer, to the carboxyl group-containing highly saturated nitrile rubber (R2) which was obtained in Synthesis Example 2, 100 parts, FEF carbon (product name "Seast G-SO", made by Tokai Carbon, carbon black) 40 parts, polyoxyethylene stearyl ether phosphate (product name "Phosphanol RL-210", made by Toho Chemical Industry, processing aid) 1 part, and 4,4'-bis-(α,α-dimethylbenzyl) diphenylamine (product name "Nocrac CD", made by Ouchi Shinko Chemical Industrial, antiaging agent) 1.5 parts were added and kneaded. Next, the mixture was transferred to a roll where a polyallylamine aqueous solution (product name "PAA-01", made by Nitto Boseki, cross-linking agent, polymer comprised of units expressed by general formula (4), weight average molecular weight (Mw) 1,600, 15 wt % aqueous solution) 12.6 parts (converted to solid content, 1.89 parts) was added and kneaded in to prepare a nitrile rubber composition.

Further, the above-mentioned methods were used to evaluate and test this for compound Mooney viscosity, a cross-linkability test, normal physical properties (tensile strength, tensile stress, hardness), cold resistance test, oil immersion test, disk compression set, and O-ring compression set. The results are shown in Table 1.

Example 2

Except for using, instead of the carboxyl group-containing highly saturated nitrile rubber (R2) 100 parts in Example 1, the carboxyl group-containing nitrile rubber (R1) which was obtained in Synthesis Example 1, 100 parts, the same procedure was followed as in Example 1 to prepare a nitrile rubber composition, and the same procedure was followed to evaluate it. The results are shown in Table 1.

Example 3

Except for adding, right before adding the polyallylamine aqueous solution 12.6 parts in Example 1, 1,3-di-o-tolylguanidine (product name "Noccelar DT", made by Ouchi Shinko Chemical Industrial, basic cross-linking accelerator) 2 parts, the same procedure was followed as in Example 1 to prepare a nitrile rubber composition, and the same procedure was followed to evaluate it. The results are shown in Table 1.

Example 4

Except for using, instead of the 1,3-di-o-tolylguanidine 2 parts in Example 3, 1,8-diazabicyclo[5,4,0]-undecene-7 (DBU) (product name: "RHENOGRAN XLA-60 (GE2014)", made by RheinChemie, comprising DBU 60 wt % (including part forming zinc dialkyldiphosphate salt) and acrylic acid polymer and dispersant 40 wt %, basic cross-linking accelerator) 4 parts, the same procedure was followed as in Example 3 to prepare a nitrile rubber composition, and the same procedure was followed to evaluate it. The results axe shown in Table 1.

Example 5

Except for using, instead of the polyallylamine aqueous solution (product name "PAA-01") 12.6 parts in Example 1, a polyallylamine aqueous solution (product name "PAA-25", made by Nitto Boseki, cross-linking agent, polymer comprised of units of the general formula (4), weight average molecular weight (Mw) 25,000, 10 wt % aqueous solution) 18.8 parts (by solid content conversion, 1.88 parts), the same procedure was followed as in Example 1 to prepare a nitrile rubber composition, and the same procedure was followed to evaluate it. The results are shown in Table 1.

Comparative Example 1

Except for using, instead of the polyallylamine aqueous solution 12.6 parts in Example 1, hexamethylenediamine carbamate (product name "Diak#1", made by DuPont Dow Elastomers, polyamine-based cross-linking agent falling under aliphatic polyvalent amines) 2.6 parts, the same procedure was followed as in Example 1 to prepare a nitrile rubber composition, and the same procedure was followed to evaluate it. The results are shown in Table 1.

TABLE 1

|  |  | Example 1 | Example 2 | Example 3 | Example 4 | Example 5 | Comp. ex. 1 |
|---|---|---|---|---|---|---|---|
| Formulation | | | | | | | |
| Carboxyl group-containing nitrile rubber | (parts) |  | 100 |  |  |  |  |
| Carboxyl group-containing highly saturated nitrin rubber | (parts) | 100 |  | 100 | 100 | 100 | 100 |
| Carbon black | (parts) | 40 | 40 | 40 | 40 | 40 | 40 |
| 4,4'-bis-(α,α-dimethylbenzyl)diphenylamine | (parts) | 1.5 | 1.5 | 1.5 | 1.5 | 1.5 | 1.5 |
| Polyoxyethylene stearyl ether phosphate | (parts) | 1 | 1 | 1 | 1 | 1 | 1 |
| Polyalylamine (Mw = 1,500) | (parts) | 1.89 | 1.89 | 1.89 | 1.89 |  |  |
| Polyalylamine (Mw = 25,500) | (parts) |  |  |  |  | 1.88 |  |
| Hexamethylenediamine carbanate | (parts) |  |  |  |  |  | 2.6 |
| 1,3-di-a-tolylguanidine | (parts) |  |  | 2 |  |  |  |
| 1,8-diazabicycle[5.4.0]-undecene-7(60% product) | (parts) |  |  |  | 4 |  |  |
| Compound Money viscosity |  | 123 | 92 | 121 | 121 | 120 | 135 |
| Cross-linkability test | | | | | | | |
| Lowest torque ML | (dN·m) | 2.77 | 2.21 | 1.31 | 1.23 | 2.85 | 1.34 |
| Highest torque MH | (dN·m) | 30.33 | 29.99 | 28.53 | 28.11 | 33.55 | 27.83 |
| $T_m$ | (min) | 0.71 | 0.71 | 0.56 | 0.65 | 0.52 | 1.34 |
| $T_m$ | (min) | 3.01 | 2.98 | 2.3 | 2.4 | 3.2 | 5.34 |
| $T_m$ | (min) | 14.23 | 14.55 | 9.31 | 9.36 | 15.3 | 18.19 |
| Normal physical properties | | | | | | | |
| Tensile strength | (MPa) | 23.7 | 24.9 | 23.0 | 24.4 | 26.2 | 24.1 |
| 20% tensile stress | (MPa) | 1.3 | 1.5 | 1.6 | 1.7 | 1.9 | 1.1 |
| 50% tensile stress | (MPa) | 3.8 | 3.9 | 5.6 | 6.8 | 5.2 | 2.6 |
| 100% tensile stress | (MPa) | 20.3 | 21.1 | 15.1 | 15.9 | 23.1 | 8.1 |
| Hardness (OURO A) |  | 78 | 70 | 80 | 77 | 79 | 75 |
| Cold resistance test | | | | | | | |
| TR10 | (°C.) | −21.7 | −19.8 | −20.3 | −20.9 | −22.8 | −18.8 |
| Oil impression test | | | | | | | |
| Volume swelling degree ΔV (Fuel B, 40° C. 72 hours) | (%) | 35.2 | 34.1 | 34.8 | 33.8 | 32.8 | 36.8 |
| Volume swelling degree ΔV (Fuel C, 40° C. 72 hours) | (%) | 52.6 | 52.0 | 51.5 | 51.2 | 49.8 | 56.4 |
| Compression set test | | | | | | | |
| Disk compression set (primary cross-linked product) | (%) | 51.2 | 48.5 | 38.9 | 37.8 | 35.1 | 78.5 |
| Disk compression set (secondary cross-linked product) | (%) | 23.4 | 20.1 | 10 | 9.9 | 9.3 | 30.2 |
| Disk compression set (secondary cross-linked product) | (%) | 29.8 | 25.3 | 12.5 | 11.9 | 10.2 | 33.4 |

From Table 1, when blending into the carboxyl group-containing nitrile rubber (R1) or carboxyl group-containing highly saturated nitrile rubber (R2) an allylamine-based polymer, the obtained cross-linked rubber has excellent tensile stress and cold resistance, further, is small in change of volume due to dipping in fuel oil and excellent in oil resistance, and is excellent in compression set (Examples 1 to 5).

On the other hand, when using, instead of an allylamine-based polymer, hexamethylene diamine carbamate as a polyamine-based cross-linking agent, the tensile stress (in particular, the 50% tensile stress and 100% tensile stress), oil resistance, and compression set resistance become inferior (Comparative Example 1).

The invention claimed is:

1. A nitrile rubber composition containing a carboxyl group-containing nitrile rubber and an allylamine-based polymer which contains units expressed by the following general formula (1):

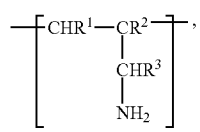

wherein in the general formula (1), $R^1$, $R^2$, and $R^3$ respectively independently are one selected from a group comprised of a hydrogen atom, alkyl group containing 1 to 4 carbon atoms which may have substituents, aryl group containing 6 to 12 carbon atoms which may have substituents, and halogen atom.

2. The nitrile rubber composition as set forth in claim 1, wherein, in said general formula (1), $R^1$, $R^2$, and $R^3$ are hydrogen atoms.

3. The nitrile rubber composition as set forth in claim 1, wherein said allylamine-based polymer is a polymer which is comprised of only units expressed by said general formula (1).

4. The nitrile rubber composition as set forth in claim 1, wherein said allylamine-based polymer has a weight average molecular weight (Mw) of 300 to 60,000,000.

5. The nitrile rubber composition as set forth in claim 1, wherein a ratio of content of said allylamine-based polymer with respect to 100 parts by weight of said carboxyl group-containing nitrile rubber is 0.1 to 20 parts by weight.

6. The nitrile rubber composition as set forth in claim 1, wherein said carboxyl group-containing nitrile rubber contains mono n-butyl maleate monomer units.

7. The nitrile rubber composition as set forth in claim 1, wherein said carboxyl group-containing nitrile rubber has an iodine value of 120 or less.

8. A cross-linked rubber obtained by cross-linking the nitrile rubber composition as set forth in claim 1.

* * * * *